United States Patent
van Baar et al.

(10) Patent No.: US 9,449,384 B2
(45) Date of Patent: Sep. 20, 2016

(54) METHOD FOR REGISTERING DEFORMABLE IMAGES USING RANDOM MARKOV FIELDS

(71) Applicant: Mitsubishi Electric Research Laboratories, Inc., Cambridge, MA (US)

(72) Inventors: Jeroen van Baar, Arlington, MA (US); Dohyung Seo, Lexintron, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 62 days.

(21) Appl. No.: 14/265,962

(22) Filed: Apr. 30, 2014

(65) Prior Publication Data
US 2015/0317788 A1    Nov. 5, 2015

(51) Int. Cl.
| | |
|---|---|
| G06T 7/00 | (2006.01) |
| G06T 11/60 | (2006.01) |
| G06K 9/52 | (2006.01) |
| G06T 7/40 | (2006.01) |
| G06K 9/62 | (2006.01) |

(52) U.S. Cl.
CPC ............... *G06T 7/0012* (2013.01); *G06K 9/52* (2013.01); *G06K 9/6215* (2013.01); *G06T 7/0026* (2013.01); *G06T 7/40* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 7,596,283 B2 | 9/2009 | Xu et al. | |
| 7,925,089 B2* | 4/2011 | Rother | G06K 9/4638 382/180 |
| 8,009,886 B2 | 8/2011 | Li et al. | |
| 2009/0046951 A1* | 2/2009 | Paragios | G06K 9/32 382/294 |
| 2010/0111386 A1* | 5/2010 | El-Baz | G06T 7/0016 382/128 |
| 2012/0281900 A1 | 11/2012 | Rueckert et al. | |

FOREIGN PATENT DOCUMENTS

WO    2012155136 A2    11/2012

OTHER PUBLICATIONS

B.M. Glocker, "Random Fields for Image Registration," PhD Dissertation, Technische Universität München, 2010.*

O. Musse, et al. "Fast deformable matching of 3D images over multiscale nested subspaces. Application to atlas-based MRI segmentation," Pattern Recognition 36 (2003) 1881-1889.*

K. Deng, et al. "An Information-Theoretic Framework to Aggregate a Markov Chain," 2009 American Control Conference, St. Louis, MO, USA, Jun. 10-12, 2009.*

Tang, T.W.H., Chung, A.C.S.: Non-rigid image registration using graph-cuts. In: Proceedings of MICCAI. pp. 916-924 (2007).

(Continued)

*Primary Examiner* — Matthew Bella
*Assistant Examiner* — Soo Shin
(74) *Attorney, Agent, or Firm* — Gene Vinokur; James McAleenan; Hironori Tsukamoto

(57) ABSTRACT

A method registers a source image with a target image, wherein the images are deformable, by first measuring dissimilarity between the source image and the target image. The dissimilarity minimized using a discrete energy function. At multiple scales, multi-scale Markov random field registration is applied to the source and target images to determine a deformation vector field. Then, the target image is warped according to the deformation field vector to obtain a warped target mage registered to the source image.

12 Claims, 2 Drawing Sheets

(56) References Cited

OTHER PUBLICATIONS

Tang, L., Hamarneh, G: Random walks with efficient search and contextually adapted image similarity for deformable registration. In: Proceedings of MICCAI 2013, vol. 8150, pp. 43-50 (2013).

Benjamin M Glocker: 11 Random Fields for Image Registration May 16, 2011. XP055205028. Retrieved from the Internet: URL:http://www.doc.ic.ac.ukj-bglockerjpdfs jglocker2011thesis. pdf [retrieved on Jul. 28, 2015] the whole document.

* cited by examiner

METHOD FOR REGISTERING DEFORMABLE IMAGES USING RANDOM MARKOV FIELDS

FIELD OF THE INVENTION

The invention relates generally registering images, and more particularly to registering deformable images.

BACKGROUND OF THE INVENTION

Deformable image registration determines, for each two- or three-dimensional (2D or 3D) pixel or voxel in a source image, a deformation vector to a target image. The problem is to determine the deformation that minimizes a difference between the source and target images after the registration.

Deformable image registration is an important component in many medical applications. For example, there is a need to align a diagnostic image of a patient to a reference image. Another example application is image-guided and adaptive radiation therapy.

Current solutions assume that the underlying deformation between two images is smooth (continuous). Existing methods include diffeomorphic demons and free-form deformation using B-splines. However, deformations can contain discontinuities. Existing methods cannot accurately recover such discontinuities. This leads to errors in the recovered deformation fields, which could have negative consequence in medical applications.

Up to now, an emphasis has been on smooth deformations. An advantage of those methods is that the deformation can be solved on a coarse grid of control points, and then interpolated to a finer resolution. Another advantage is the fact that the deformations are free from folds, i.e., the Jacobian map of the deformation has no negative values.

However, those methods cannot accurately determine solutions in the presence of discontinuities in the deformation field. For example, in 4D computed tomography (CT) images of the chest motion, there is a deformation discontinuity between the lung and surrounding tissue due to breathing.

Deformable registration can be partioned into continuous and discrete approaches. In deformable registration using discrete optimization, large deformations and smooth solutions require subpixel accurate deformation vectors. This will result in a very large set of labels.

One method reduces the size of the set of labels by starting with a coarse label set. By examining a corresponding random walk solution, that method determines where labels need to be refined, and redetermine a solution and iterate. If, however, the data contains some mixture of deformations, that approach also result in the need to solve a problem with a large set of labels. Another method uses a similar refinement scheme for a control points based dense registration.

SUMMARY OF THE INVENTION

The embodiments of the invention provide a method for registering deformable images using a discrete optimization. Discrete optimization can better deal with discontinuities in the deformable images. Discrete optimization uses a set of discrete deformation labels. To balance smooth and discontinuous parts in the deformation, subpixel or subvoxel deformation labels are used. Solving continuous deformations using discrete optimization requires a fine distribution of the discrete labels. Coupled with the size of typical medical images, this poses additional challenges to determine solutions efficiently.

The problem is solved by reducing the number of labels, without sacrificing the accuracy. The embodiments use a multi-scale approach, which considers a constant number of labels at every scale. The initial scale considers coarse deformations, and higher scales consider finer (subpixel/voxel) deformations. Compared to "naïve" labels, this drastically reduces the number of labels to consider.

DETAILED DESCRIPTION OF THE PREFERRED EMBODIMENTS

Figure 1:
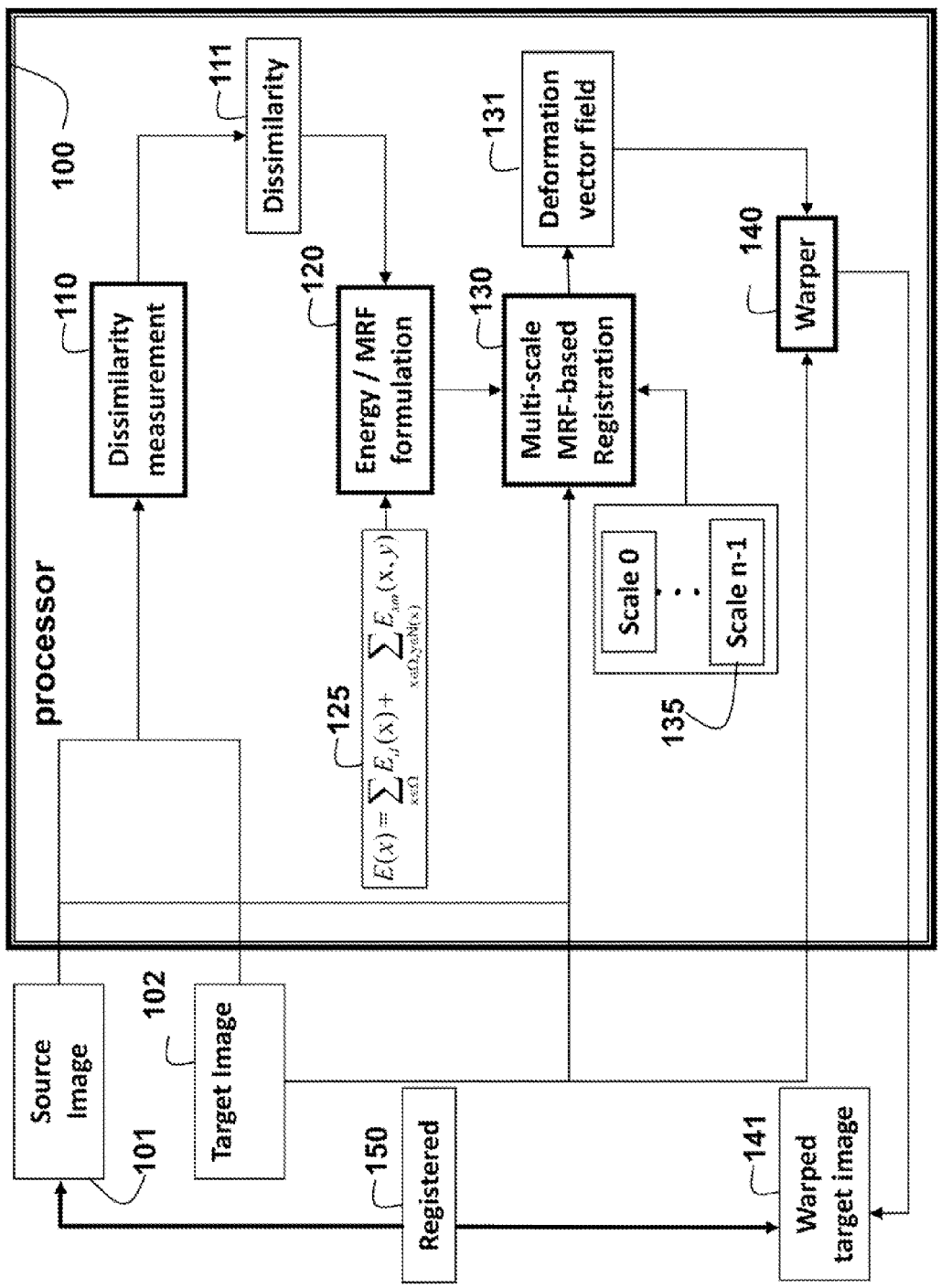
FIG. 1 is a flow diagram of a method for registering deformable images according to embodiments of the invention.

FIG. 1 shows a method for registering deformable images according to embodiments of our invention. A dissimilarity 111 between a source image 101 and a target image 102 are measured 110. For example, we can use a sum of squared differences (SSD) for measuring the dissimilarity. Other dissimilarity metrics, e.g., normalized cross correlation or mutual information, in the case of multi-modal input data, can also be used.

The dissimilarity is minimized 120 using a discrete energy function 125. At multiple scales (scale 0, . . . , scale n−1) 135, also see scales 301 FIG. 2, multi-scale Markov random field (MRF) registration 130 is applied to the source and target images to determine a deformation vector field 131. Then, the target image is warped 140 to obtain a warped target image 141 registered 150 to the source image, that is, the registration is backwards.

Note, we can also measure the similarity, and then maximize the energy function. The steps of the method can be performed in a processor 100 connected to memory and input/output interfaces by buses as known in the art. The processor can be a graphic processor unit (GPU), or multi-core processor.

Figure 2:
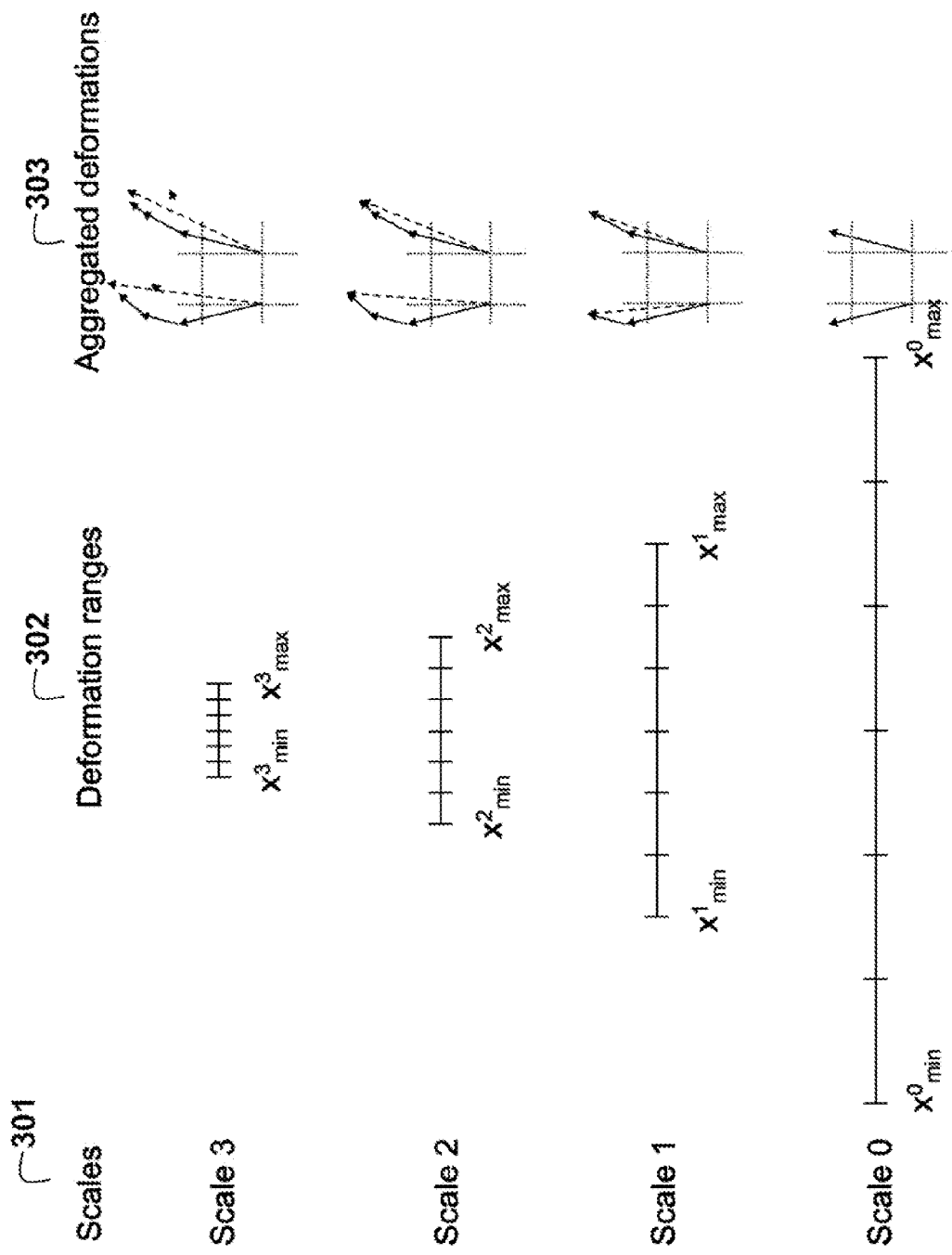
FIG. 2 is a schematic of a multiple scales, deformations and aggregated deformations according to embodiments of the invention.

FIG. 2 shows multiple scales 301, deformation ranges 302, and aggregated deformations 303. The scales are arranged in a coarse-to-fine order from bottom to top. Our invention solves a discrete optimization problem using the multi-scale approach. By considering the multiple scales, we can reduce the total number of discrete labels that need to be considered for an accurate solution. At each scale, we consider a subset of the labels, starting with the labels that represent deformation at a coarse scale 0. For example, we can start with "integer" deformations, i.e., deformations that only consider integer pixel coordinates.

At each successive finer scale, e.g., (1 2 3), we consider subpixel deformations. The idea is that after we have established a coarse deformation, we refine the deformation at the next scale. However, in this refinement, we consider a smaller range sampled at a higher rate. For example, if the most coarse scale considers [−3 −2 −1 0 1 2 3], a finer scale could consider [−1.5 −1.0 −0.5 0 0.5 1.0 1.5]. We can repeat this strategy until a desired accuracy is achieved.

The final deformation vectors are aggregated at each scale. We have to consider this in our optimization strategy. The optimization relies on a regularization term. The regularization term assumes, within some local neighborhood, that the deformations are smooth. In a multi-scale approach, the regularization is imposed over aggregated deformation vectors. Due to the aggregation, the problem can no longer be solved using conventional graph cuts (GC), and maximal flow/minimal cut. Instead, we use a quadratic pseudo-Boolean optimization (QPBO) procedure. If the QPBO cannot solve the problem for each pixel/voxel, then an UNKNOWN label is assigned. In this case, we perform an additional step to determine the label for which the corresponding energy is lowest.

Multi-Scale Graph-Cuts

The goal of deformable registration is to register a deformable N-dimensional image M to a fixed (reference) N-dimensional image F. The result of the registration procedure yields a deformation vector field $T:u \in \Re^N$. Rather than solving a forward registration problem: $M(T(x))=\tilde{F}$, we solve a backward registration, i.e., $\forall x \in \Omega_F: T(x) = u_{F \to M}$. Here, $\Omega_F$ is a domain of the fixed image.

We optimize an energy function 125:

$$E(x) = \int_\Omega E_d(x) + \int_\Omega E_{sm}(x), \qquad (1)$$

where $E_d$ is a data term, and $E_{sm}$ is a smoothness term, e.g., a Student-t distribution. The data term is a measure of the dissimilarity, and the smoothness term is as a regularizer, by imposing some prior probability on the deformation. Equation 1 is typically optimized by minimizing the total energy.

Continuous optimization methods assume that the underlying deformation is smooth. Methods, such as diffeomorphic demons or free-form deformations using B-splines, can yield good results if the deformation is smooth. However, those methods cannot handle cases where the deformation contains discontinuities. Therefore, we optimize Equation 1 using discrete optimization.

For discrete optimization, the solution space needs to be discretized into a set of possible deformations $T=\{t_1, \ldots, t_n\}$. Each discrete deformation is associated with a label: $L=\{\forall i \in T: l_i \leftrightarrow t_i\}$, and the optimization of Equation 1 becomes a labeling problem. Equation 1 is rewritten as;

$$E(x) = \sum_{x \in \Omega} E_d(x) + \sum_{x \in \Omega, y \in N(x)} E_{sm}(x, y). \qquad (2)$$

In Equation 2, x and y are random variables which take on values from the set L. The smoothness term is now defined as a distance function over the labels. Discrete optimization problems involving multiple labels can be solved using alpha expansion with graph cuts. Efficient graph cuts rely on minimal cut and maximal flow. which assume that the energy function is submodular, i.e., the binary potential is a metric, i.e., that satisfies a triangle inequality $$f(x=0,y=0)+f(x=1,y=1) \leq f(x=1,y=0)+f(x=0,y=1).$$

For the multi-label case, the problem is broken down into binary problems comparing two labels each time. For example in α-expansion, if a variable takes on the value 0 this means it keeps its current label, whereas the value 1 means that the variable takes on the label $\alpha \in L$.

The discretization of the solution space depends on the underlying deformation. To obtain accurate results, we use subpixel deformation values. A fine sampling of the solution space leads to a large number of labels. However, the complexity of alpha expansion grows linear with the number of pixels, and the number of labels. Therefore, we use a multi-scale approach. At each scale, we consider only a subset of the labels.

Assuming S scales, e.g., S is selected such that we sample to about a 0.1 pixel resolution, with scale 0 corresponding to the coarsest scale. The maximum deformation is between some lower and upper limit $\lfloor r_{l,d}, \ldots, r_{u,d} \rfloor$ pixels, where d is the dimension index, e.g., d=1, 2 for 2D. We define $\delta s_d^k$ as the scale divisor at level $k \in [1, \ldots, S]$, with $\delta s_d^{k+1} = \delta s_d^k + \epsilon_d^k$, where $\epsilon_k=0.5$, for example. At scale k we have:

$$[r_{l,d}^{k+1}, \ldots, r_{u,d}^{k+1}] = \left[\frac{r_{l,d}^k}{\delta s_d^k}, \ldots, \frac{r_{u,d}^k}{\delta s_d^k}\right], \qquad (3)$$

with $\delta s^0=1$. In the 2D case, if $r_l=-5$, $r_u=5$, and we want to obtain a 0.133 resolution we would have to consider only $4 \times 11^2=484$ labels. For the non-multi-scale GC, we would have to consider $(2 \times 5 \times 7.5+1)^2=5776$ labels.

With this multi-scale approach, the smoothness function no longer satisfies the metric requirement (nor semi-metric), because we regularize deformation vectors aggregated over scales, rather than over labels within a scale. Equation 2 is therefore non-submodular. To optimize the non-submodular function, we use the alpha expansion and the QPBO. When all terms are submodular, QPBO labels all the nodes in the graph. However, in the case of non-submodular terms, QPBO only gives a partial labeling, and some nodes have unknown labels. We observe that this occurs only for a few iterations, and a just small (typically <30) number of nodes. For each node that is not assigned, we check which label gives a lower energy (α or current label) and assign this label to the node.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for registering a source image with a target image using multiple scales, wherein the images are deformable, the method comprising:
   measuring dissimilarity between the source image and the target image;
      using the measured dissimilarity for each scale of the multiple scales to minimize a discrete energy function, wherein the discrete energy function for each scale contains a data term and a smoothness term, the data term represents deformation vectors as discrete labels, and the smoothness term imposes prior probabilities on the deformation to preserve discontinuities, and wherein prior to warping the source image, each scale includes:
      applying multi-scale Markov random field registration to determine a labeling which corresponds to a deformation vector field; and
      accumulating the deformation vector field via deformation vector addition to an accumulated deformation vector field determined at a previous scale, wherein the deformation vectors are added on the basis that the deformation vector field at a final scale corresponds to the deformation vector field at a desired resolution, such that the final deformation vectors are aggregated at each scale prior to warping;

warping the source image, according to the accumulated deformation vector field at the desired resolution, to obtain the target image, wherein the steps are performed in a processor.

2. The method of claim 1, wherein the dissimilarity is measured using a sum of squared differences.

3. The method of claim 1, wherein the dissimilarity is measured using normalized cross correlation.

4. The method of claim 1, wherein the dissimilarity is measured using mutual information.

5. The method of claim 1, wherein the multiple scales are arranged in a coarse to fine order, and wherein the coarse scale uses integer pixel deformations, and finer scales use subpixel deformations.

6. The method of claim 1, wherein the energy function includes the data term, and the smoothness term, wherein the data term is a measure of the dissimilarity, and the smoothness term is a regularizer.

7. The method of claim 6, wherein the regularization term is imposed over accumulating the deformation vector field, such that local discontinuities in the deformation vectors are preserved.

8. The method of claim 7, wherein the regularization term is spatially varying and determined locally from the input data.

9. The method of claim 1, wherein the discrete energy function is minimized using a quadratic pseudo-Boolean optimization (QPBO) procedure.

10. The method of claim 1, wherein the dissimilarity is obtained from a machine learning computation approach.

11. A system for registering a target image with a source image using multiple scales, wherein the images are deformable, the system comprising:
at least one processor, coupled to at least one memory, the at least one processor to perform the steps of:
measuring dissimilarities between the target image and the source image;
using the measured dissimilarity for each scale of the multiple scales to minimize a discrete energy function, wherein the discrete energy function contains a data term and a smoothness term, the data term represents deformation vectors as discrete labels, and the smoothness term is a regularizer that imposes prior probabilities on the deformation to preserve discontinuities, wherein prior to warping the source image, each scale includes:
applying discrete optimization to determine a labeling which corresponds to a deformation vector field, wherein discontinuities in the deformation vector field are preserved; and
accumulating the deformation vector field via deformation vector addition to an accumulated deformation vector field determined at a previous scale, wherein the deformation vectors are added on the basis that the deformation vector field at a final scale corresponds to the deformation vector field at a desired resolution, such that the final deformation vectors are aggregated at each scale prior to warping.

12. The method of claim 11, wherein the discrete optimization includes using a quadratic pseudo-Boolean optimization (QPBO) in determining the labeling, and during use of QPBO, if a discrete label cannot be assigned for each pixel in the target image, an unknown discrete label is assigned, then an additional step is applied to assign an identified label that has corresponding energy that is lowest.

* * * * *